US012598647B2

(12) United States Patent　　(10) Patent No.: US 12,598,647 B2
Lin et al.　　(45) Date of Patent: Apr. 7, 2026

(54) EFFICIENT PRE-CHANNEL RESERVATION MECHANISM FOR TWT AND RESTRICTED TWT IN OBSS DENSE NETWORKS

(71) Applicant: MediaTek Inc., Hsinchu City (TW)

(72) Inventors: Ying-You Lin, Hsinchu City (TW); Kuo-Wei Chen, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 315 days.

(21) Appl. No.: 18/228,734

(22) Filed: Aug. 1, 2023

(65) Prior Publication Data

US 2024/0080890 A1　　Mar. 7, 2024

Related U.S. Application Data

(60) Provisional application No. 63/403,306, filed on Sep. 2, 2022.

(51) Int. Cl.
　H04W 74/08　　(2024.01)
　H04W 74/0816　　(2024.01)

(52) U.S. Cl.
　CPC ... H04W 74/0816 (2013.01); H04W 74/0866 (2013.01)

(58) Field of Classification Search
　CPC ................................................. H04W 74/0816
　See application file for complete search history.

(56) References Cited

U.S. PATENT DOCUMENTS

| | | | |
|---|---|---|---|
| 7,443,759 B1 | 10/2008 | Rowlands et al. | |
| 10,359,831 B2 | 7/2019 | Crawford et al. | |

| | | | |
|---|---|---|---|
| 2008/0120514 A1 | 5/2008 | Ismail et al. | |
| 2012/0173907 A1 | 7/2012 | Moses et al. | |
| 2013/0111121 A1 | 5/2013 | Ananthakrishnan et al. | |
| 2022/0070772 A1 * | 3/2022 | Ho | H04W 52/0216 |
| 2022/0078844 A1 * | 3/2022 | Cherian | H04W 74/08 |
| 2022/0086858 A1 | 3/2022 | Luo et al. | |
| 2024/0373350 A1 * | 11/2024 | Baek | H04W 52/0229 |

FOREIGN PATENT DOCUMENTS

| | | | |
|---|---|---|---|
| EP | 4284106 A1 | 11/2023 | |
| GB | 2603939 A | 8/2022 | |
| WO | WO 2022075821 A1 | 4/2022 | |
| WO | WO 2022084341 A1 | 4/2022 | |
| WO | WO 2022158801 A1 | 7/2022 | |

OTHER PUBLICATIONS

European Patent Office, Extended European Search Report in European Patent Application No. 23191084.5-1206, Feb. 15, 2024.
Taiwan Intellectual Property Office, Office Action in Taiwan Patent Application No. 112132298, May 31, 2024.
Rubayet Shafin et al. [Samsung]: "Commonet Resolution on TWT", IEEE P802.11 Wireless LAN, IEEE 802.11-22/1051r1, Jul. 10, 2022.

* cited by examiner

*Primary Examiner* — Pamit Kaur
(74) *Attorney, Agent, or Firm* — Andy M. Han; Han IP PLLC

(57)　　ABSTRACT

Techniques pertaining to an efficient pre-channel reservation mechanism for target wake time (TWT) and restricted TWT (rTWT) in overlapping basic service set (OBSS) dense networks are described. A first station (STA) transmits a frame to reserve a reservation period. The first STA then communicates with a second STA during the reservation period which aligns at least partially with a target wake time (TWT) service period (SP) or a restricted TWT (rTWT) SP of the second STA.

15 Claims, 6 Drawing Sheets

100

| STA 110 | | STA 120 |
|---|---|---|

WIRELESS COMMUNICATIONS WITH AN EFFICIENT PRE-CHANNEL RESERVATION MECHANISM FOR TARGET WAKE TIME (TWT) AND RESTRICTED TWT (rTWT) IN AN OVERLAPPING BASIC SERVICE SET (OBSS) DENSE NETWORK

100

STA
120

WIRELESS COMMUNICATIONS WITH AN EFFICIENT PRE-CHANNEL RESERVATION
MECHANISM FOR TARGET WAKE TIME (TWT) AND RESTRICTED TWT (RTWT) IN
AN OVERLAPPING BASIC SERVICE SET (OBSS) DENSE NETWORK

STA
110

Figure 5:
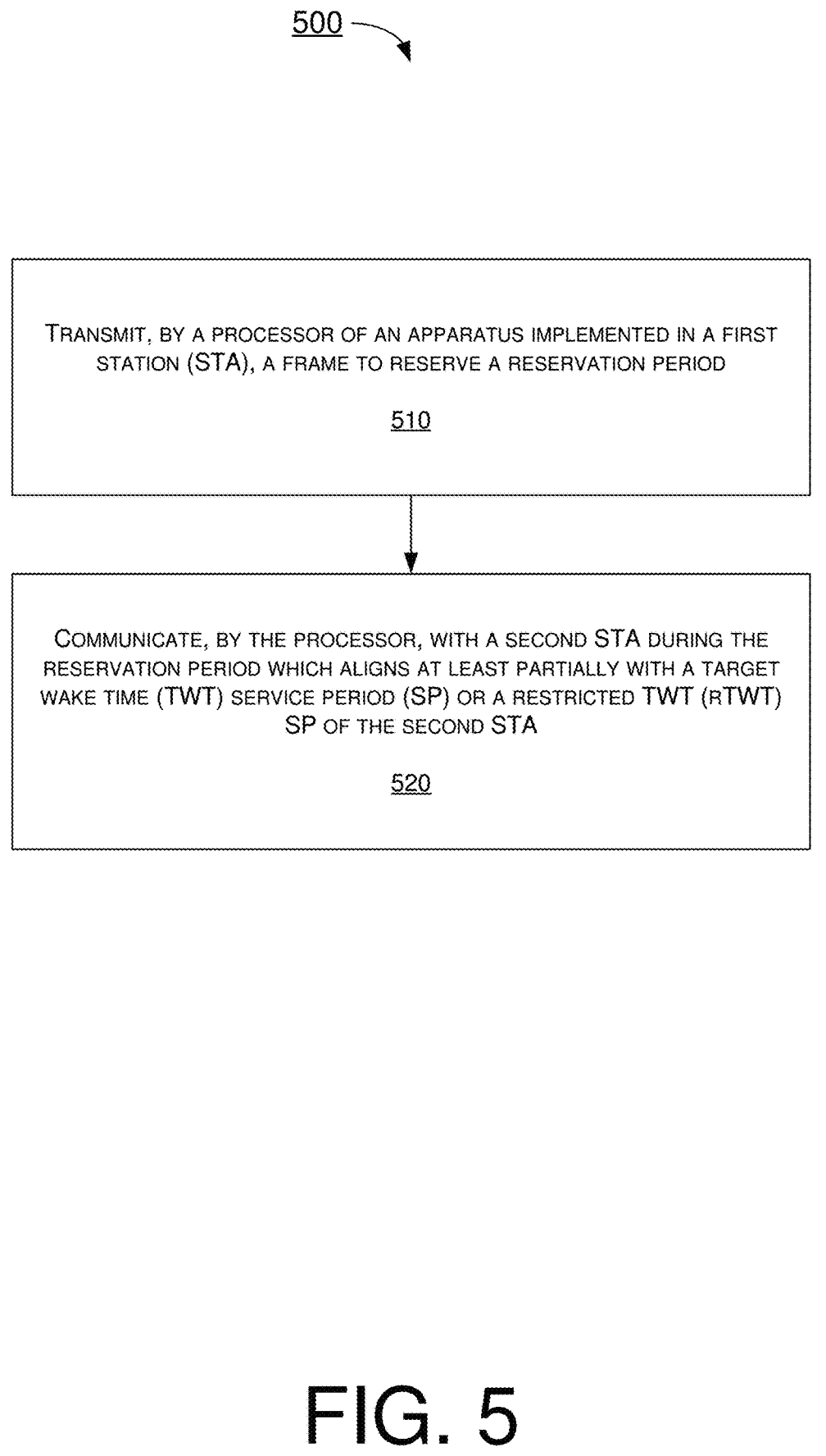

500 ⟍

TRANSMIT, BY A PROCESSOR OF AN APPARATUS IMPLEMENTED IN A FIRST
STATION (STA), A FRAME TO RESERVE A RESERVATION PERIOD

510

COMMUNICATE, BY THE PROCESSOR, WITH A SECOND STA DURING THE
RESERVATION PERIOD WHICH ALIGNS AT LEAST PARTIALLY WITH A TARGET
WAKE TIME (TWT) SERVICE PERIOD (SP) OR A RESTRICTED TWT (RTWT)
SP OF THE SECOND STA

Figure 6:
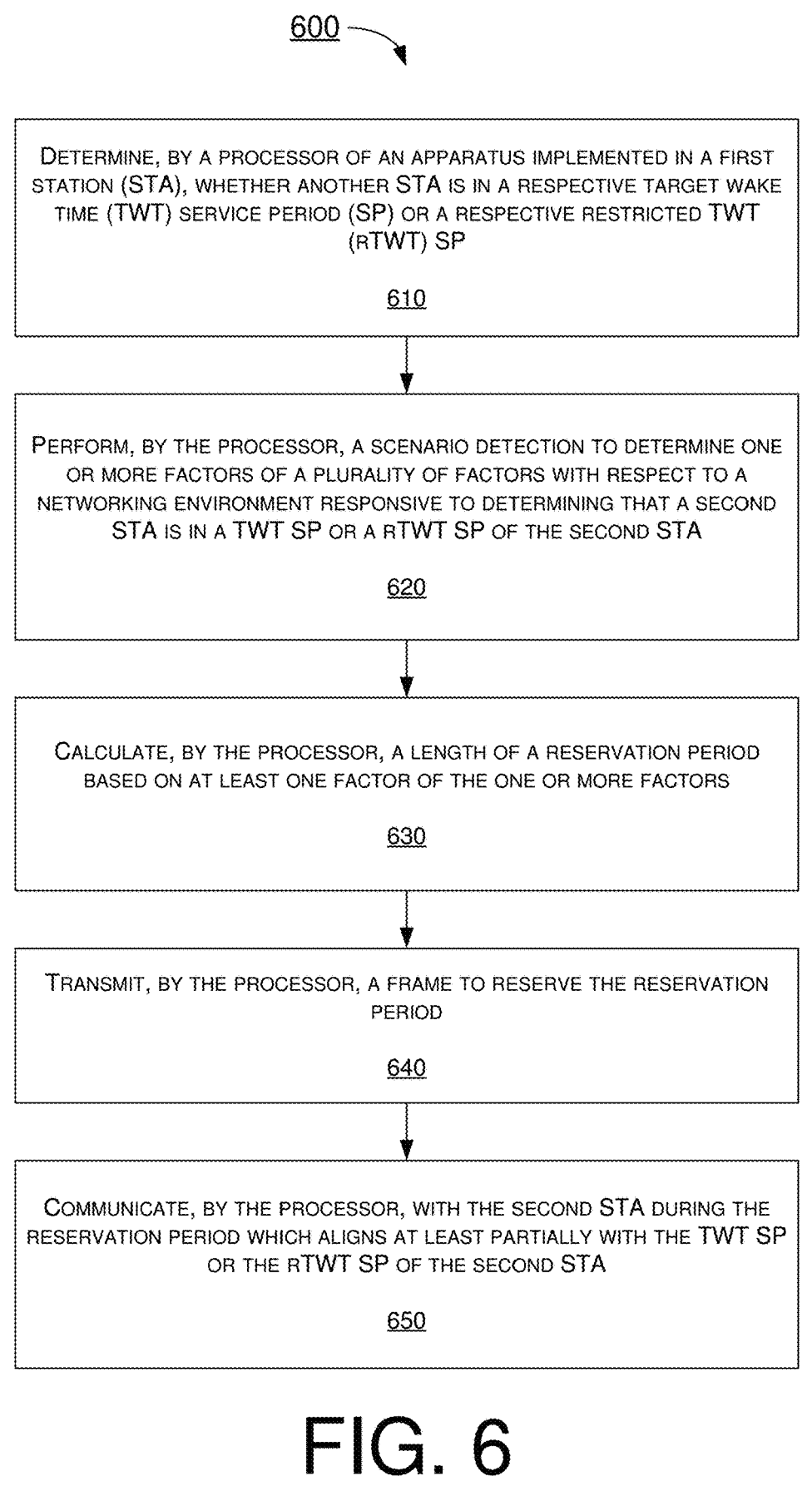

DETERMINE, BY A PROCESSOR OF AN APPARATUS IMPLEMENTED IN A FIRST STATION (STA), WHETHER ANOTHER STA IS IN A RESPECTIVE TARGET WAKE TIME (TWT) SERVICE PERIOD (SP) OR A RESPECTIVE RESTRICTED TWT (RTWT) SP

610

PERFORM, BY THE PROCESSOR, A SCENARIO DETECTION TO DETERMINE ONE OR MORE FACTORS OF A PLURALITY OF FACTORS WITH RESPECT TO A NETWORKING ENVIRONMENT RESPONSIVE TO DETERMINING THAT A SECOND STA IS IN A TWT SP OR A RTWT SP OF THE SECOND STA

620

CALCULATE, BY THE PROCESSOR, A LENGTH OF A RESERVATION PERIOD BASED ON AT LEAST ONE FACTOR OF THE ONE OR MORE FACTORS

630

TRANSMIT, BY THE PROCESSOR, A FRAME TO RESERVE THE RESERVATION PERIOD

640

COMMUNICATE, BY THE PROCESSOR, WITH THE SECOND STA DURING THE RESERVATION PERIOD WHICH ALIGNS AT LEAST PARTIALLY WITH THE TWT SP OR THE RTWT SP OF THE SECOND STA

EFFICIENT PRE-CHANNEL RESERVATION MECHANISM FOR TWT AND RESTRICTED TWT IN OBSS DENSE NETWORKS

CROSS REFERENCE TO RELATED PATENT APPLICATION(S)

The present disclosure is part of a non-provisional application claiming the priority benefit of U.S. Patent Application No. 63/403,306, filed 2 Sep. 2022, the content of which herein being incorporated by reference in its entirety.

TECHNICAL FIELD

The present disclosure is generally related to mobile communications and, more particularly, to an efficient pre-channel reservation mechanism for target wake time (TWT) and restricted TWT (rTWT) in overlapping basic service set (OBSS) dense networks.

BACKGROUND

Unless otherwise indicated herein, approaches described in this section are not prior art to the claims listed below and are not admitted as prior art by inclusion in this section.

In wireless communications, such as WiFi (or Wi-Fi) and wireless local area network (WLAN) communications in accordance with the Institute of Electrical and Electronics Engineers (IEEE) 802.11 specifications, TWT in WiFi6 or rTWT in WiFi7 is designed to minimize the contention among stations (STAs) and to save power. The TWT and rTWT allow an access point (AP) and a STA to communicate with each other to define a specific time or duration to access the wireless communication medium. Accordingly, it is believed that TWT and rTWT can help reduce contention and overlap in transmissions between STAs as well as greatly extend STA sleep time to reduce power consumption.

With TWT, transmissions by intra-basic service set (intra-BSS) users can be scheduled in a well-defined way. However, contention from OBSS STAs cannot be reduced or otherwise addressed by TWT/rTWT under current IEEE specifications. Undesirably, this could cause additional latency and more power consumption on the part of STAs, and this issue could be worse in an OBSS-dense network environment. Therefore, there is a need for a solution of an efficient pre-channel reservation mechanism for TWT/rTWT in OBSS dense networks.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to an efficient pre-channel reservation mechanism for TWT/rTWT in OBSS dense networks. It is believed that under various proposed schemes in accordance with the present disclosure, aforementioned issues may be addressed, resolved or otherwise alleviated.

In one aspect, a method may involve a processor of an apparatus implemented in a first STA transmitting a frame to reserve a reservation period. The method may also involve the processor communicating with a second STA during the reservation period which aligns at least partially with a TWT service period (SP) or a rTWT SP of the second STA.

In another aspect, a method may involve a processor of an apparatus implemented in a first STA determining whether another STA is in a respective TWT SP or a respective rTWT SP. The method may then involve the processor performing a scenario detection to determine one or more factors of a plurality of factors with respect to a networking environment responsive to determining that a second STA is in a TWT SP or a rTWT SP of the second STA. The method may also involve the processor calculating a length of a reservation period based on at least one factor of the one or more factors. The method may further involve the processor transmitting a frame to reserve the reservation period and communicating with the second STA during the reservation period which aligns at least partially with the TWT SP or the rTWT SP of the second STA.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, Zig Bee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 5 is a flowchart of an example process in accordance with an implementation of the present disclosure.

FIG. 6 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to an efficient pre-channel reservation mechanism for TWT/rTWT in OBSS dense networks. According to the present disclosure, a number of possible solutions may be implemented separately or jointly. That is, although these possible solutions may be described below separately, two or more of these possible solutions may be implemented in one combination or another.

Figure 1:
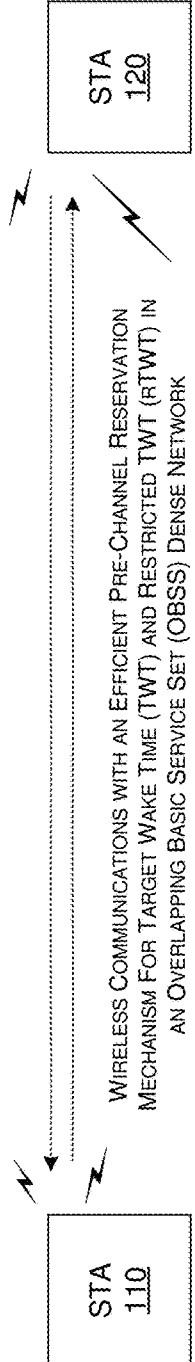
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve at least a first STA, STA 110, communicating wirelessly with a second STA, STA 120. Each of STA 110 and STA 120 may function as a non-access point (non-AP) STA or, alternatively, an AP STA. In some cases, STA 110 and STA 120 may be associated with a same BSS in accordance with one or more IEEE 802.11 standards (e.g., IEEE 802.11be and future-developed standards). Each of STA 110 and STA 120 may be configured to communicate with each other by utilizing the efficient pre-channel reservation mechanism for TWT/rTWT in OBSS dense networks in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
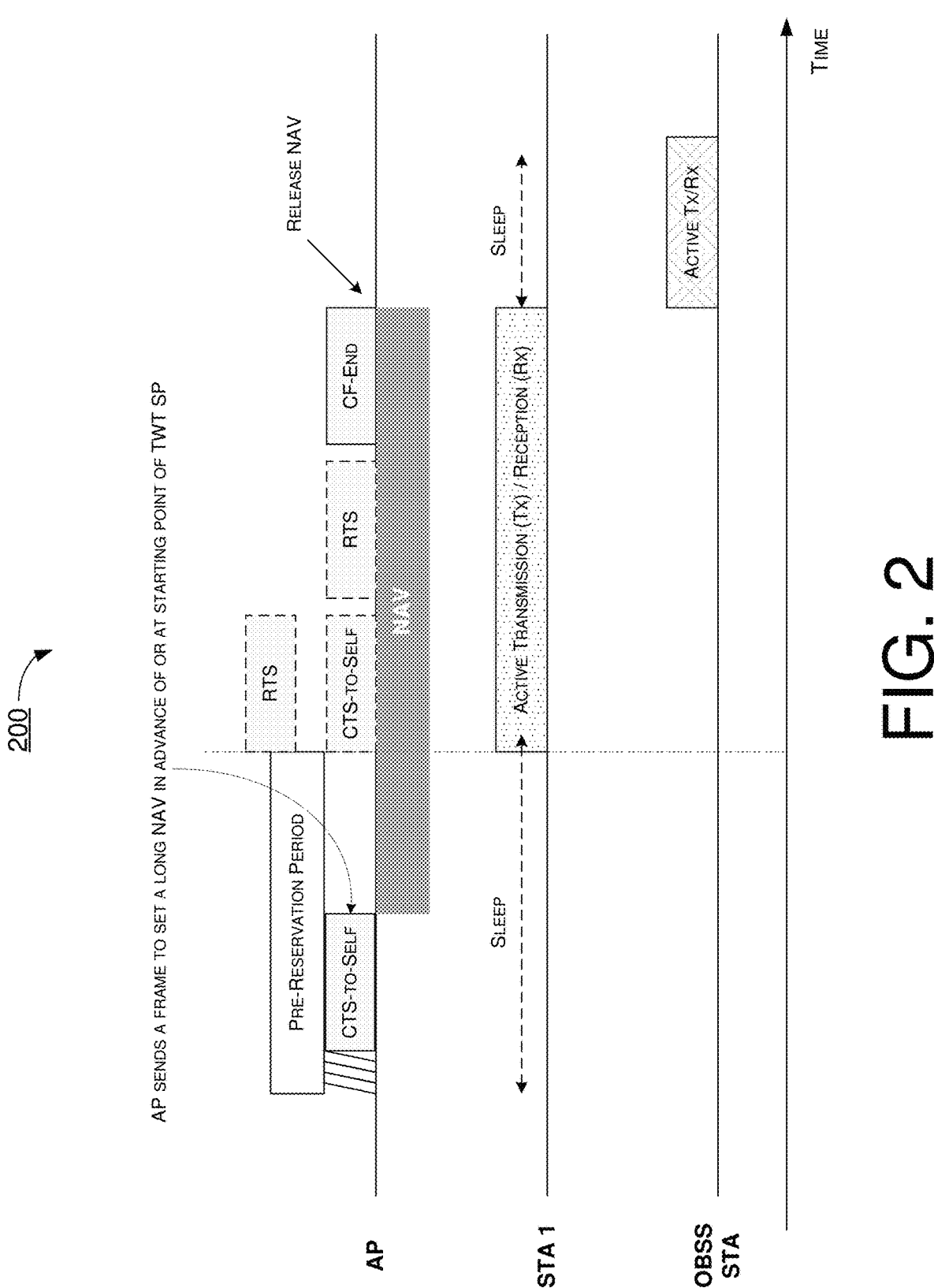
FIG. 2 is a diagram of an example scenario under a proposed scheme in accordance with the present disclosure.

FIG. 2 illustrates an example scenario 200 under a proposed scheme in accordance with the present disclosure. Referring to FIG. 2, when time approaches a TWT wake-up service period (herein interchangeably referred to as "TWT SP" and "TWT service period") for one or more STAs to wake up from a sleep mode, an AP may transmit one or more Protection frames, one or more Data frames, one or more Trigger frames, or one or more Control frames in advance during a Pre-Reservation Period. The Pre-Reservation Period may include a network allocation vector (NAV) length based on a length or duration of the TWT wake-up service period and current OBSS congestion status by using high-priority backoff parameters in a ready phase. Accordingly, the AP may set a long NAV (e.g., longer than normal or without implementation of the proposed scheme) in advance or on time depending on the scenario. Moreover, the AP may transmit a Contention Free-End (CF-End) frame at the end of the TWT wake-up service period to release the NAV. Advantageously, as the NAV is universally understood by STAs within the BSS as well as STAs in one or more OBSSs, the setting of the NAV effectively reserves a period of time for one or more STAs in the BSS to wake up and perform transmission (Tx) and/or reception (Rx) during a respective TWT SP without being suffering interference from other STAs in one or more OBSSs.

Under the proposed scheme, the AP may transmit a Control frame (e.g., a clear-to-send-to-self (CTS-to-self) frame) to set a long NAV in advance or on time based on scenario detection performed by the AP (e.g., to detect whether there is an existence of any OBSS, any inter-BSS STA or a OBSS-dense environment such that initiation of the pre-channel reservation mechanism under the proposed scheme is warranted or otherwise required). The time period from the time to the start point of TWT wake-up service period may be referred to as the "pre-reservation period" herein. A duration of the pre-reservation period may range from zero to a long period (e.g., within 1 microsecond ($\mu$s)~100 milliseconds (ms)). In an event that the pre-reservation period is zero, it may mean to align with the start point of the TWT wake-up service period.

Under the proposed scheme, the pre-reservation period may be determined based on one or more of the following factors: (i) a TWT/rTWT SP duration or TWT/rTWT service time; (ii) a number of active STAs; (iii) an airtime occupied by an intra or inter-BSS or an OBSS; (iv) an application quality of service (QoS) priority (e.g., the priority of the QoS associated with a traffic of the application to be transmitted); and (v) a throughput of each STA (e.g., throughput of each STA for which a reservation period is to be reserved). Under the proposed scheme, the NAV period may be determined based on one or more of the following factors: (i) a TWT/rTWT SP duration or TWT/rTWT service time; (ii) a number of active STAs; (iii) an airtime occupied by an intra or inter-BSS or an OBSS; (iv) an application QoS priority (e.g., the priority of the QoS associated with a traffic of the application to be transmitted); and (v) a throughput of each STA (e.g., throughput of each STA for which a reservation period is to be reserved).

Figure 3:
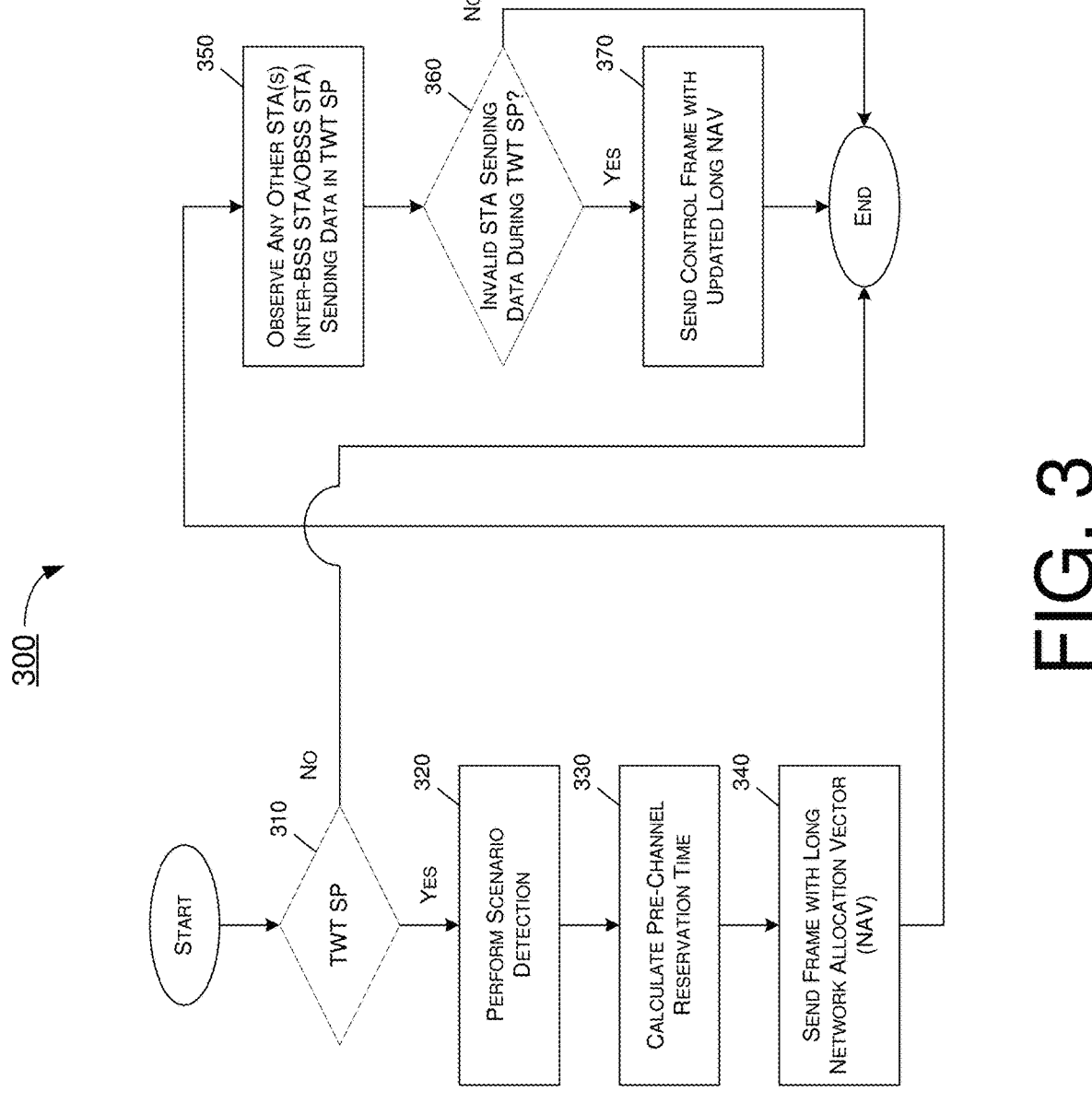
FIG. 3 is a diagram of an example algorithm under a proposed scheme in accordance with the present disclosure.

FIG. 3 illustrates an example algorithm 300 under a proposed scheme in accordance with the present disclosure. Algorithm 300 may represent an aspect of implementing various proposed designs, concepts, schemes, systems and methods described above. More specifically, algorithm 300 may represent an aspect of the proposed concepts and schemes pertaining to an efficient pre-channel reservation mechanism for TWT/rTWT in OBSS dense networks in accordance with the present disclosure. Algorithm 300 may include one or more operations, actions, or functions as illustrated by one or more of blocks 310, 320, 330, 340, 350, 360 and 370. Algorithm 300 may be performed or otherwise executed by an AP STA or a non-AP STA (e.g., STA 110 and/or STA 120).

At 310, the STA (e.g., AP STA) may determine whether or not one or more STAs are in a TWT SP. In an event of a negative result from the determination (e.g., "no"), algorithm 300 may end. In an event of a positive result from the determination (e.g., "yes"), algorithm 300 may proceed from 310 to 320.

At 320, the STA may perform a scenario detection to determine whether the network environment is crowded (e.g., with many STAs transmitting and/or receiving) and/or whether there are wireless communications by OBSS and/or inter-BSS STAs. Algorithm 300 may proceed from 320 to 330.

At 330, the STA may perform a pre-channel reservation time calculation. For instance, the STA may calculate the pre-channel reservation time based on a TWT SP duration, a number of active STAs, an airtime occupied by intra or inter-BSS or OBSS, an application QoS priority, and/or the throughput of each STA, among other factors. Algorithm 300 may proceed from 330 to 340.

At 340, the STA may transmit a control frame with a long NAV so as to reserve a period of time (e.g., a portion or an entirety of the TWT service period) during which another STA (e.g., non-AP STA) may be in active wireless transmission and/or reception. Algorithm 300 may proceed from 340 to 350.

At 350, the STA may observe or otherwise determine whether there is/are any other STA(s) (e.g., inter-BSS STA(s) and/or OBSS STA(s)) transmitting data in the TWT SP. Algorithm 300 may proceed from 350 to 360.

At 360, based on the observation, the STA may determine whether there is any invalid STA (e.g., inter-BSS STA(s) and/or OBSS STA(s)) transmitting data during the TWT SP. In an event of a negative result from the determination (e.g., "no"), algorithm 300 may end. In an event of a positive result from the determination (e.g., "yes"), algorithm 300 may proceed from 360 to 370.

At 370, the STA may transmit a control frame with an updated long NAV (e.g., to increase the length of the reservation period). Algorithm 300 may end at this point.

In view of the above, in an illustrative and non-limiting example scenario, an AP STA or non-AP STA (e.g., STA 110 or STA 120) may send a Protection frame or Control frame or Data frame (e.g., null data) in advance of or at the beginning of a TWT service period so as to reserve a period of time (e.g., a portion or an entirety of the TWT service period) during which another STA may be in active wireless transmission and/or reception. This AP STA (e.g., AP router) or non-AP STA may be a STA that is aware of the TWT SP and is an initiator to schedule the TWT service period (e.g., a soft AP in a smartphone or a group owner (GO) in a Wi-Fi peer-to-peer (P2P) scenario). The Protection frame may be a request-to-send (RTS) frame, a CTS-Self frame, a multi-user RTS (MU-RTS) frame, a Trigger frame or any Data frame that carries a NAV value. The point in time that the Protection frame/Control frame/Data frame is sent may be earlier than a starting point of the TWT SP such as, for example, before the starting point of the TWT SP by about 1 μs~100 ms. The length or duration of the NAV (and hence the reservation period) may align with the TW wake-up service period+Δtime, where Δtime may be in the range of 1 μs~100 ms. Also, the length or duration of the NAV (and hence the reservation period) may be smaller than the TWT wake-up service period by a little. In the TWT service period, in an event that the AP detects that there is no downlink (DL) or uplink (UL) data, the AP (or a NAV initiator) may send a CF-End frame to terminate the reservation period early so as to avoid unnecessarily occupying the channel or medium (and wasting time/frequency resources). Alternatively, the AP may send the CF-End frame at the end of the TWT service period to release the NAV protection period to other STAs.

Illustrative Implementations

Figure 4:
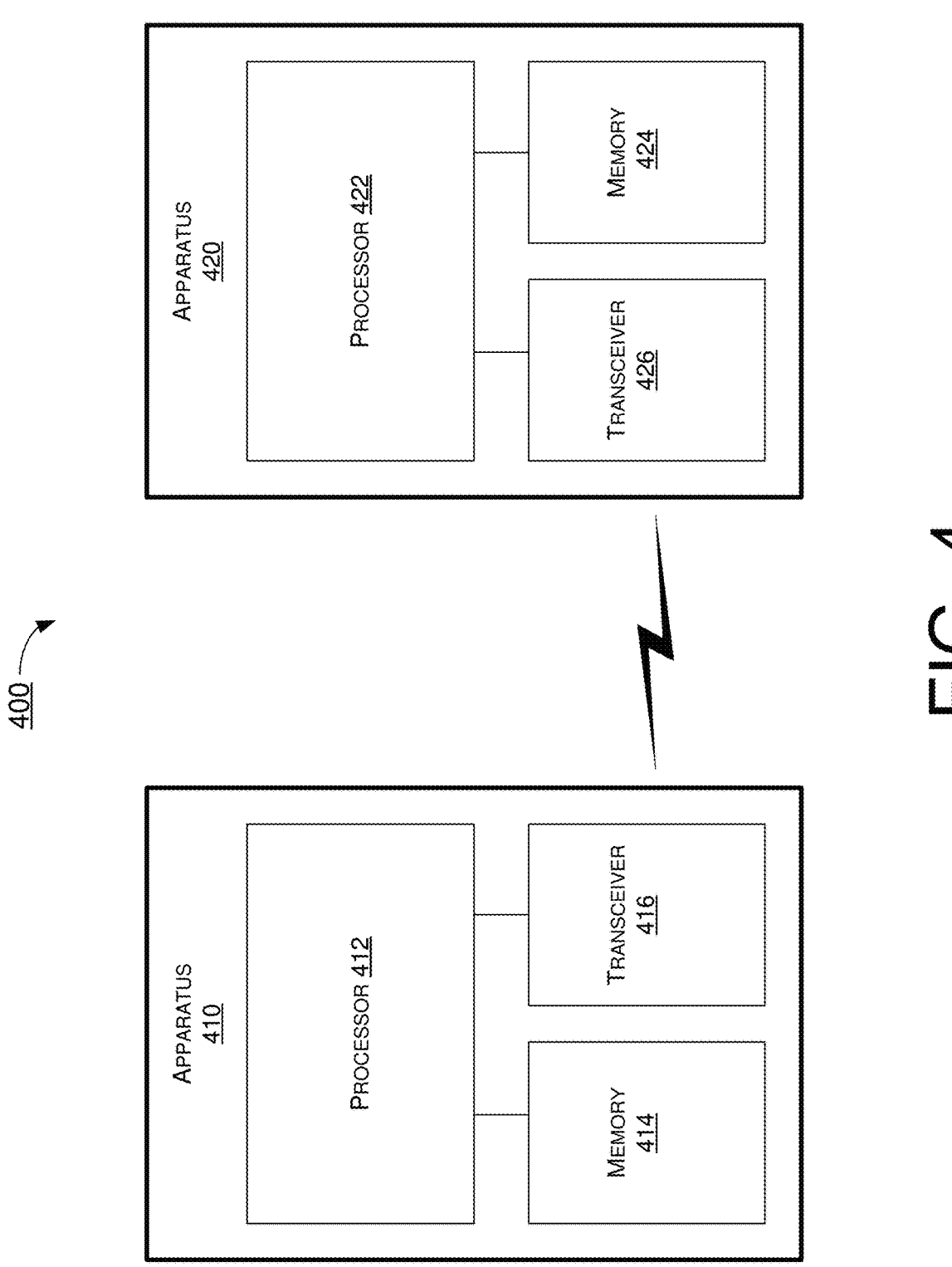
FIG. 4 is a block diagram of an example communication system in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to an efficient pre-channel reservation mechanism for TWT/rTWT in OBSS dense networks, including the various schemes described above with respect to various proposed designs, concepts, schemes, systems and methods described above as well as processes described below. For instance, apparatus 410 may be implemented in STA 110 and apparatus 420 may be implemented in STA 120, or vice versa.

Each of apparatus 410 and apparatus 420 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in a network node, such as an AP in a WLAN.

In some implementations, each of apparatus 410 and apparatus 420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 410 and apparatus 420 may be implemented in or as a STA or an AP. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, one or more RISC processors or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to an efficient pre-channel reservation mechanism for TWT/rTWT in OBSS dense networks in accordance with various implementations of the present disclosure.

In some implementations, apparatus 410 may also include a transceiver 416 coupled to processor 412. Transceiver 416 may include a transmitter capable of wirelessly transmitting and a receiver capable of wirelessly receiving data. In some implementations, apparatus 420 may also include a transceiver 426 coupled to processor 422. Transceiver 426 may include a transmitter capable of wirelessly transmitting and a receiver capable of wirelessly receiving data. It is noteworthy that, although transceiver 416 and transceiver 426 are illustrated as being external to and separate from processor 412 and processor 422, respectively, in some implementations, transceiver 416 may be an integral part of processor 412 as a system on chip (SoC), and transceiver 426 may be an integral part of processor 422 as a SoC.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as STA 110, and apparatus 420, as STA 120, is provided below. It is noteworthy that, although a detailed description of capabilities, functionalities and/or technical features of apparatus 420 is provided below, the same may be applied to apparatus 410 although a detailed description thereof is not provided solely in the interest of brevity. It is also noteworthy that, although the example implementations described below are provided in the context of WLAN, the same may be implemented in other types of networks.

Under various proposed schemes pertaining to an efficient pre-channel reservation mechanism for TWT/rTWT in OBSS dense networks in accordance with the present disclosure, processor 412 of apparatus 410, as a first STA (e.g., STA 110), may transmit, via transceiver 416, a frame to reserve a reservation period. Moreover, processor 412 may communicate, via transceiver 416, with apparatus 420, as a second STA (e.g., STA 120), during the reservation period which aligns at least partially with a TWT SP or a rTWT SP of the second STA.

In some implementations, in transmitting the frame, processor 412 may transmit the frame in advance of or at a starting point of the TWT SP or the rTWT SP of the second STA. In some implementations, in an event that the frame is transmitted in advance of the TWT SP or the rTWT SP of the second STA, the frame may be transmitted in advance by 1 μs~100 ms.

In some implementations, the frame may include a protection frame, control frame or data frame (e.g., null data frame). For instance, the frame may include a RTS frame, a CTS-to-self frame, a MU-RTS frame or a trigger frame.

In some implementations, a length of the reservation period may be equal to or less than the TWT SP or the rTWT SP of the second STA.

In some implementations, the frame may carry a NAV, with a value of the NAV corresponding to a length of the reservation period. In such cases, processor 412 may also determine, prior to transmitting the frame, the value of the NAV based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

In some implementations, in transmitting the frame, processor 412 may transmit the frame during a pre-reservation period prior to a starting point of the TWT SP or the rTWT SP of the second STA. In such cases, processor 412 may also determine a length of the pre-reservation period based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

In some implementations, processor 412 may further transmit, via transceiver 416, a CF-end frame at an end point of the reservation period to release the reservation period or before the end point to terminate the reservation period early. In some implementations, in an event that the CF-end frame is transmitted before the end point of the reservation period, in transmitting the CF-end frame, processor 412 may transmit the CF-end frame responsive to detecting no UL or DL traffic associated with the second STA.

Under various proposed schemes pertaining to an efficient pre-channel reservation mechanism for TWT/rTWT in OBSS dense networks in accordance with the present disclosure, processor 412 of apparatus 410, as a first STA (e.g., STA 110), may determine whether another STA is in a respective TWT SP or a respective rTWT SP. Additionally, processor 412 may perform, via transceiver 416, a scenario detection to determine one or more factors of a plurality of factors with respect to a networking environment responsive to determining that apparatus 420, as a second STA (e.g., STA 120), is in a TWT SP or a rTWT SP of the second STA. Moreover, processor 412 may calculate a length of a reservation period based on at least one factor of the one or more factors. Furthermore, processor 412 may transmit, via transceiver 416, a frame to reserve the reservation period. Also, processor 412 may communicate, via transceiver 416, with the second STA during the reservation period which aligns at least partially with the TWT SP or the rTWT SP of the second STA.

In some implementations, processor 412 may also determine whether any inter-BSS or OBSS STA is transmitting during the TWT SP or the rTWT SP of the second STA. Moreover, processor 412 may transmit, via transceiver 416, another frame to increase the length of the reservation period responsive to determining at least one inter-BSS or OBSS STA transmitting during the TWT SP or the rTWT SP of the second STA.

In some implementations, the frame may carry a NAV, with a value of the NAV corresponding to a length of the reservation period. In such cases, process 500 the value of the NAV may be determined based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

In some implementations, in transmitting the frame, processor 412 may transmit the frame during a pre-reservation period which is prior to a starting point of the TWT SP or the rTWT SP of the second STA. In some implementations, a length of the pre-reservation period may be determined based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

Illustrative Processes

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to an efficient pre-channel reservation mechanism for TWT/rTWT in OBSS dense networks in accordance with the present disclosure. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed repeatedly or iteratively. Process 500 may be implemented by or in apparatus 410 and apparatus 420 as well as any variations thereof. Solely for illustrative purposes and without limiting the scope, process 500 is described below in the context of apparatus 410 implemented in or as STA 110 functioning as an AP STA and apparatus 420 implemented in or as STA 120 functioning as a non-AP STA of a wireless network such as a WLAN in network environment 100 in accordance with one or more of IEEE 402.11 standards. Process 500 may begin at block 510.

At 510, process 500 may involve processor 412 of apparatus 410, as a first STA (e.g., STA 110), transmitting, via transceiver 416, a frame to reserve a reservation period. Process 500 may proceed from 510 to 520.

At 520, process 500 may involve processor 412 communicating, via transceiver 416, with apparatus 420, as a second STA (e.g., STA 120), during the reservation period which aligns at least partially with a TWT SP or a rTWT SP of the second STA.

In some implementations, in transmitting the frame, process 500 may involve processor 412 transmitting the frame in advance of or at a starting point of the TWT SP or the rTWT SP of the second STA. In some implementations, in an event that the frame is transmitted in advance of the TWT SP or the rTWT SP of the second STA, the frame may be transmitted in advance by 1 μs~100 ms.

In some implementations, the frame may include a protection frame, control frame or data frame (e.g., null data frame). For instance, the frame may include a RTS frame, a CTS-to-self frame, a MU-RTS frame or a trigger frame.

In some implementations, a length of the reservation period may be equal to or less than the TWT SP or the rTWT SP of the second STA.

In some implementations, the frame may carry a NAV, with a value of the NAV corresponding to a length of the reservation period. In such cases, process 500 may further involve processor 412 determining, prior to transmitting the frame, the value of the NAV based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

In some implementations, in transmitting the frame, process 500 may involve processor 412 transmitting the frame during a pre-reservation period prior to a starting point of the TWT SP or the rTWT SP of the second STA. In such cases, process 500 may further involve processor 412 determining a length of the pre-reservation period based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

In some implementations, process 500 may further involve processor 412 transmitting, via transceiver 416, a CF-end frame at an end point of the reservation period to release the reservation period or before the end point to terminate the reservation period early. In some implementations, in an event that the CF-end frame is transmitted before the end point of the reservation period, in transmitting the CF-end frame, process 500 may involve processor 412 transmitting the CF-end frame responsive to detecting no UL or DL traffic associated with the second STA.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to an efficient pre-channel reservation mechanism for TWT/rTWT in OBSS dense networks in accordance with the present disclosure. Process 600 may include one or more operations, actions, or functions as illustrated by one or more of blocks 610, 620, 630, 640 and 650. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 410 and apparatus 420 as well as any variations thereof. Solely for illustrative purposes and without limiting the scope, process 600 is described below in the context of apparatus 410 implemented in or as STA 110 functioning as an AP STA and apparatus 420 implemented in or as STA 120 functioning as a non-AP STA of a wireless network such as a WLAN in network environment 100 in accordance with one or more of IEEE 402.11 standards. Process 600 may begin at block 610.

At 610, process 600 may involve processor 412 of apparatus 410, as a first STA (e.g., STA 110) determining whether another STA is in a respective TWT SP or a respective rTWT SP. Process 600 may proceed from 610 to 620.

At 620, process 600 may involve processor 412 performing, via transceiver 416, a scenario detection to determine one or more factors of a plurality of factors with respect to a networking environment responsive to determining that apparatus 420, as a second STA (e.g., STA 120), is in a TWT SP or a rTWT SP of the second STA. Process 600 may proceed from 620 to 630.

At 630, process 600 may involve processor 412 calculating a length of a reservation period based on at least one factor of the one or more factors. Process 600 may proceed from 630 to 640.

At 640, process 600 may involve processor 412 transmitting, via transceiver 416, a frame to reserve the reservation period. Process 600 may proceed from 640 to 650.

At 650, process 600 may involve processor 412 communicating, via transceiver 416, with the second STA during the reservation period which aligns at least partially with the TWT SP or the rTWT SP of the second STA.

In some implementations, process 600 may involve processor 412 performing additional operations. For instance, process 600 may involve processor 412 determining whether any inter-BSS or OBSS STA is transmitting during the TWT SP or the rTWT SP of the second STA. Moreover, process 600 may involve processor 412 transmitting, via transceiver 416, another frame to increase the length of the reservation period responsive to determining at least one inter-BSS or OBSS STA transmitting during the TWT SP or the rTWT SP of the second STA.

In some implementations, the frame may carry a NAV, with a value of the NAV corresponding to a length of the reservation period. In such cases, process 500 the value of the NAV may be determined based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

In some implementations, in transmitting the frame, process 600 may involve processor 412 transmitting the frame during a pre-reservation period which is prior to a starting point of the TWT SP or the rTWT SP of the second STA. In some implementations, a length of the pre-reservation period may be determined based on at least one factor of a plurality of factors. In some implementations, the plurality of factors may include: (i) a TWT service time or a rTWT service time of the second STA; (ii) a number of active STAs; (iii) an airtime occupied by an intra or inter-BSS or an OBSS; (iv) an application QoS priority; and (v) a throughput of the second STA.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

transmitting, by a processor of an apparatus implemented in a first station (STA), a frame to reserve a reservation period;

communicating, by the processor, with a second STA during the reservation period which aligns at least partially with a target wake time (TWT) service period (SP) or a restricted TWT (rTWT) SP of the second STA; and determining, by the processor, a length of a pre-reservation period based on at least one factor of a plurality of factors, wherein the transmitting of the frame comprises transmitting the frame during the pre-reservation period prior to a starting point of the TWT SP or the rTWT SP of the second STA, and wherein the plurality of factors comprise:

a TWT service time or a rTWT service time of the second STA;

a number of active STAs;

an airtime occupied by an intra or inter-basic service set (BSS) or an overlapping basic service set (OBSS);

an application quality of service (QoS) priority; and a throughput of the second STA.

2. The method of claim 1, wherein the transmitting of the frame comprises transmitting the frame in advance of or at a starting point of the TWT SP or the rTWT SP of the second STA.

3. The method of claim 2, wherein, in an event that the frame is transmitted in advance of the TWT SP or the rTWT SP of the second STA, the frame is transmitted in advance by 1 μs~100 ms.

4. The method of claim 1, wherein the frame comprises a protection frame, control frame or data frame.

5. The method of claim 1, wherein the frame comprises request-to-send (RTS) frame, a clear-to-send (CTS)-to-self frame, a multi-user RTS (MU-RTS) frame or a trigger frame.

6. The method of claim 1, wherein a length of the reservation period is equal to or less than the TWT SP or the rTWT SP of the second STA.

7. The method of claim 1, wherein the frame carries a network allocation vector (NAV), and wherein a value of the NAV corresponds to a length of the reservation period.

8. The method of claim 7, further comprising:

determining, by the processor and prior to transmitting the frame, the value of the NAV based on at least one factor of a plurality of factors.

9. The method of claim 8, wherein the plurality of factors comprise:

a TWT service time or a rTWT service time of the second STA;

a number of active STAs;

an airtime occupied by an intra or inter-basic service set (BSS) or an overlapping basic service set (OBSS);

an application quality of service (QoS) priority; and a throughput of the second STA.

10. The method of claim 1, further comprising:

transmitting, by the processor, a contention free end (CF-end) frame at an end point of the reservation period to release the reservation period or before the end point to terminate the reservation period early.

11. The method of claim 10, wherein, in an event that the CF-end frame is transmitted before the end point of the reservation period, the transmitting of the CF-end frame comprises transmitting the CF-end frame responsive to detecting no uplink (UL) or downlink (DL) traffic associated with the second STA.

12. A method, comprising:

determining, by a processor of an apparatus implemented in a first station (STA), whether another STA is in a respective target wake time (TWT) service period (SP) or a respective restricted TWT (rTWT) SP;

performing, by the processor, a scenario detection to determine one or more factors of a plurality of factors with respect to a networking environment responsive to determining that a second STA is in a TWT SP or a rTWT SP of the second STA;

calculating, by the processor, a length of a reservation period based on at least one factor of the one or more factors;

transmitting, by the processor, a frame to reserve the reservation period; and communicating, by the processor, with the second STA during the reservation period which aligns at least partially with the TWT SP or the rTWT SP of the second STA, wherein the transmitting of the frame comprises transmitting the frame during a pre-reservation period which is prior to a starting point of the TWT SP or the rTWT SP of the second STA, and wherein a length of the pre-reservation period is determined based on at least one factor of a plurality of factors, and wherein the plurality of factors comprise:

a TWT service time or a rTWT service time of the second STA;

a number of active STAs;

an airtime occupied by an intra or inter-basic service set (BSS) or an overlapping basic service set (OBSS);

an application quality of service (QoS) priority; and a throughput of the second STA.

13. The method of claim 12, further comprising:

determining, by the processor, whether any inter-basic service set (BSS) or overlapping basic service set (OBSS) STA is transmitting during the TWT SP or the rTWT SP of the second STA; and transmitting, by the processor, another frame to increase the length of the reservation period responsive to determining at least one inter-BSS or OBSS STA transmitting during the TWT SP or the rTWT SP of the second STA.

14. The method of claim 12, wherein the frame carries a network allocation vector (NAV), and wherein a value of the NAV corresponds to a length of the reservation period.

15. The method of claim 14, wherein the value of the NAV is determined based on at least one factor of a plurality of factors, and wherein the plurality of factors comprise:

a TWT service time or a rTWT service time of the second STA;

a number of active STAs;

an airtime occupied by an intra or inter-basic service set (BSS) or an overlapping basic service set (OBSS);

an application quality of service (QoS) priority; and a throughput of the second STA.

* * * * *